April 22, 1952  J. WEBER ET AL  2,593,945
MACHINE FOR USE IN THE MANUFACTURE OF FOOTWEAR
Filed Nov. 22, 1949  6 Sheets-Sheet 1

Inventors
Jack Weber
Thomas Parkinson Charnley
By
Agents

April 22, 1952   J. WEBER ET AL   2,593,945
MACHINE FOR USE IN THE MANUFACTURE OF FOOTWEAR
Filed Nov. 22, 1949   6 Sheets-Sheet 3

Inventors
Jack Weber
Thomas Parkinson Charnley
By
Agents

April 22, 1952  J. WEBER ET AL  2,593,945
MACHINE FOR USE IN THE MANUFACTURE OF FOOTWEAR
Filed Nov. 22, 1949  6 Sheets-Sheet 4

Inventors
Jack Weber
Thomas Parkinson Charnley
By
Lucke + Lucke
Agents

April 22, 1952  J. WEBER ET AL  2,593,945
MACHINE FOR USE IN THE MANUFACTURE OF FOOTWEAR
Filed Nov. 22, 1949  6 Sheets-Sheet 5

Inventors
Jack Weber
Thomas Parkinson Charnley
By
Lucke & Lucke
Agents

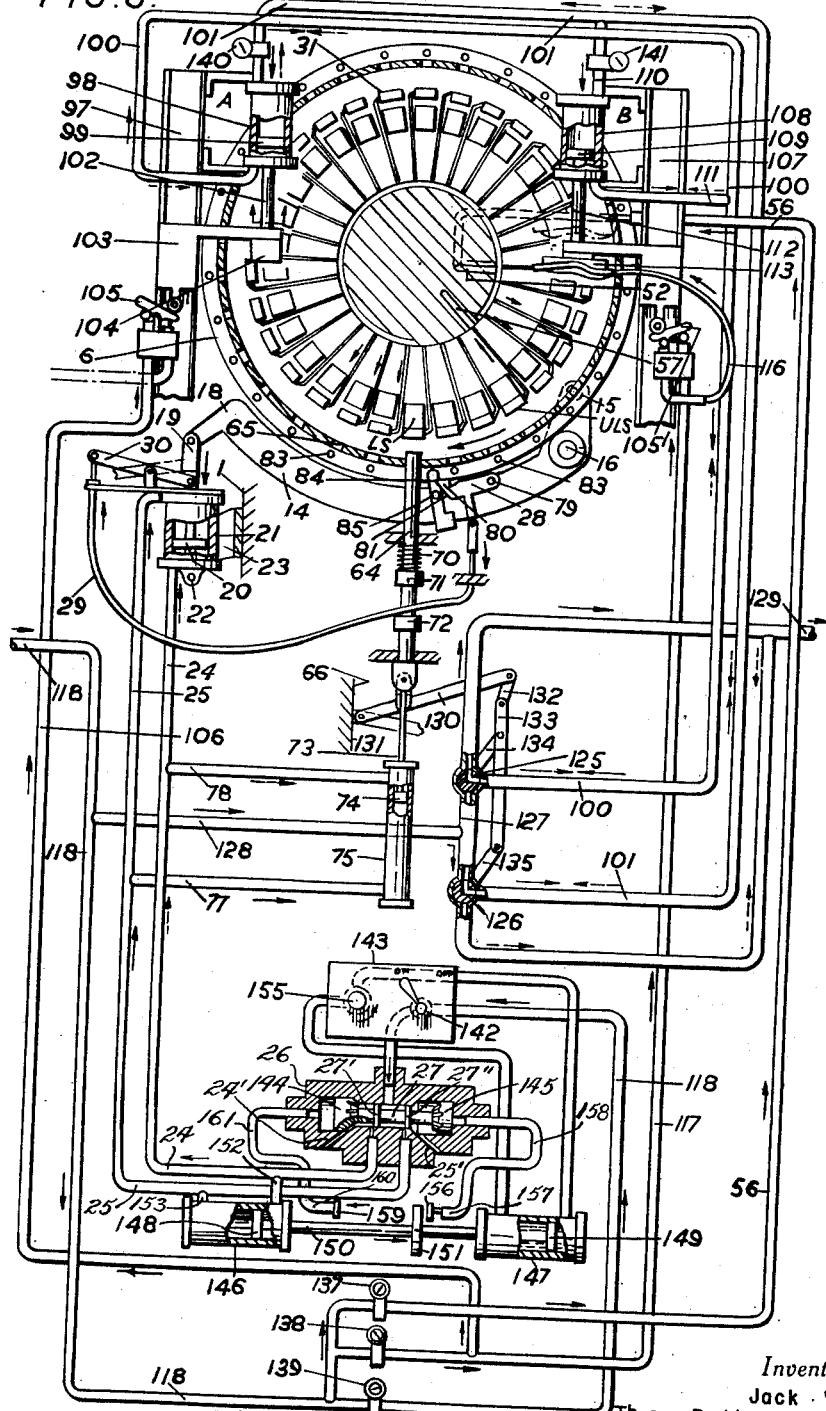

Patented Apr. 22, 1952

2,593,945

UNITED STATES PATENT OFFICE 2,593,945

MACHINE FOR USE IN THE MANUFACTURE OF FOOTWEAR

Jack Weber and Thomas Parkinson Charnley, Tottenham, London, England

Application November 22, 1949, Serial No. 128,694
In Great Britain December 17, 1948

17 Claims. (Cl. 12—31.6)

This invention concerns a new or improved machine for use in the manufacture of footwear such as boots, shoes, slippers and sandals, all of which, inclusive of similar articles of footwear, will hereinafter be referred to, for the sake of brevity, inclusively as "shoes."

More particularly the invention is concerned with a machine which will facilitate the carrying out in succession of a series of manufacturing operations or processing steps in the manufacture of a shoe, for instance, the applying thereto successively of a through-sole and a heel with the intermediate operations of buffing, scouring, the application of adhesive, and the final trimming of the applied sole and heel.

According to this invention there is provided a machine for use in the manufacture of shoes, such machine comprising a plurality of mutually spaced lasts each adapted to receive a shoe to be operated upon, said lasts each comprising at least two relatively movable parts so that each last is expansible in the direction of its length whereby it can be adapted to fit shoes of varying sizes within a predetermined range of sizes, fluid pressure operated means for traversing said lasts successively from and then back to a loading station, fluid pressure operated means for automatically expanding each last in turn after the loading thereof to adjust the length of the last to suit the size of shoe placed thereon, and means for automatically contracting each of said lasts as it returns to said loading station, whereby the shoe on the last may be removed therefrom.

According to a further feature of the invention the said lasts are carried by a travelling support adapted to move the lasts in steps through a closed circuit and preferably the said travelling support is in the form of a rotary table adapted to be rotationally advanced step by step, the lasts being arranged at equi-angularly spaced intervals around the axis of rotation of the table.

According to a further feature of the invention the fluid operated means for automatically expanding the lasts may comprise a piston and cylinder associated with each last for independently controlling the same.

According to a further feature of the invention automatically operating means may be provided for controlling the expansion of the lasts, such means being adapted to regulate the supply of pressure fluid to the fluid pressure operated means, e. g. the said pistons and cylinders, for expanding the lasts.

The said automatically operating last expansion controlling means may comprise a rotary valve, part of which rotates with the said table relatively to the other part which may be stationary, the said rotary valve being provided with passages and ports adapted to co-operate for supplying the required lasts with the pressure for expanding the lasts, and maintaining the same expanded, respectively at and over the required position and portion of the cycle of movement of the lasts.

According to a further feature of the invention means may be provided for automatically contracting each last at an appropriate position in its travel cycle. Preferably the said last contraction means will be arranged to operate at a position spaced from the said loading station and serving as a last unlocking station so that each last is contracted on the way back to the loading station prior to reaching the latter.

According to a still further feature of the invention means may be provided for temporarily locking each last in a stationary condition at the end of each step in its movement, and for then releasing the last for further movement and preferably the said locking and releasing of the lasts is effected automatically by fluid pressure operated means.

According to a further feature of the invention the said fluid pressure operated means for locking each last in a stationary condition may comprise a bolt adapted for periodic co-operation with the said rotary table carrying the lasts to lock the table, and consequently the lasts, in the stationary position with a last at the loading station.

According to a further feature of the invention the said table may be advanced step by step with respect to the loading station through the medium of a one-way driving member operated from a fluid pressure responsive piston.

According to a still further feature of the invention the said driving means for the table may be so inter-related with the fluid pressure operating means for the table locking mechanism that the said driving means only act to advance the lasts after the latter have been released from the effect of the said locking means, the driving means ceasing to operate to advance the lasts prior to the latter being relocked by the said locking means.

According to a still further feature of the invention the machine may be furnished with one or more processing stations to which the said lasts are adapted to be brought in turn and at which one or more manufacturing operations may be carried out on the shoes on the said lasts, said processing station or stations being so disposed that, when a last is located at the said loading station, a further last (with a shoe thereon) will be located at the said processing station or at each of such stations.

According to another feature of the invention fluid pressure operated or controlled processing means e. g. a pressure pad, may be provided at the said processing station or at each of the said processing stations for effecting the said manufacturing operation or operations on a shoe or shoes, and means may be provided whereby such processing means is or are automatically brought into operation each time the said travelling support or table comes to rest and whereby said processing means may be taken out of operation at the end of any processing step.

According to a still further feature of the invention the fluid pressure operating means for the said processing means may be so interrelated with the fluid pressure operating means for the last locking mechanism that the said processing means are automatically brought into action when the lasts have been locked against further advance but moved out of action before the lasts are released for further advancement.

The arrangement is preferably such that the extent of the expansion of each of the said lasts is determined by the size of the shoe placed thereon.

Although the said processing means may comprise a pressure pad, which may be inflatable, it will be understood that the processing means may be of other forms for example a scouring wheel driven by an electric motor and, whatever the form of the processing means, they are, according to this invention, preferably brought into an operating position with respect to a shoe on a last by means of fluid pressure actuated mechanism. Thus, for example, the processing means may be carried upon a piston rod of a fluid operated piston.

According to a further feature of the invention an automatic control is provided by which all the various movements of the machine are regulated in synchronism.

The pressure fluid employed for operating the various parts of the machine may be a pneumatic or a hydraulic fluid. Preferably, however, a pneumatic fluid is used and hereinafter the invention will be described as applied to a machine which is operated pneumatically; it will, however, be understood that relatively minor modifications only would be required to make such a machine operable hydraulically.

Further features of the invention will become apparent from the following particular description and claims.

In order that the nature of the invention may be more readily understood and carried into practice, one embodiment of the same will now be described by way of example with reference to the accompanying drawings in which:

Figure 8 is a diagrammatical view of the apparatus showing the pneumatic circuit.

Figure 5:
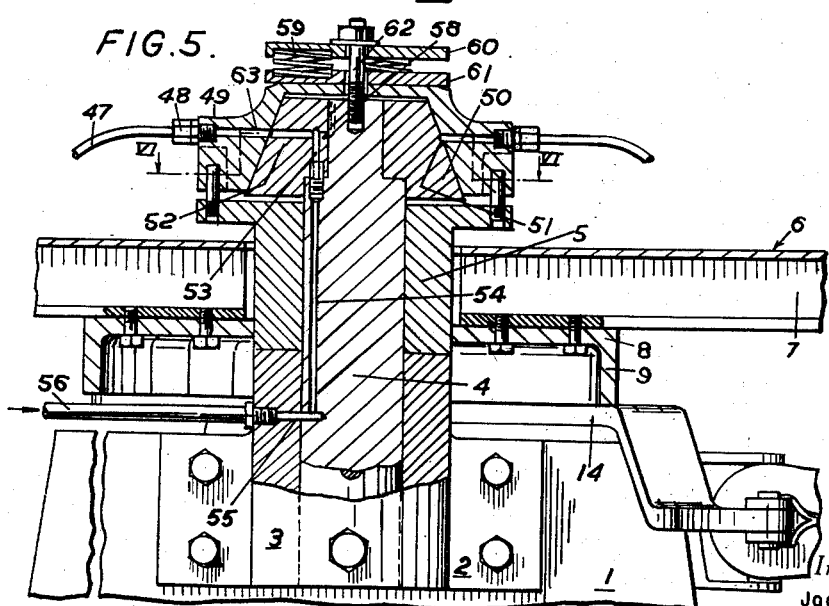
Figure 5 is an enlarged vertical section through the centre of the table and its mounting.

The machine illustrated in the drawings is pneumatically operated. It comprises a central hollow pedestal 1 which is conveniently of rectangular form in plan and splays outwardly at its lower part. At its upper end the pedestal carries a central bracket 2 (Fig. 5) having a central tubular boss 3 whose axis is vertical and in which is fixed the lower end of a cylindrical pivot post 4.

Figure 3:
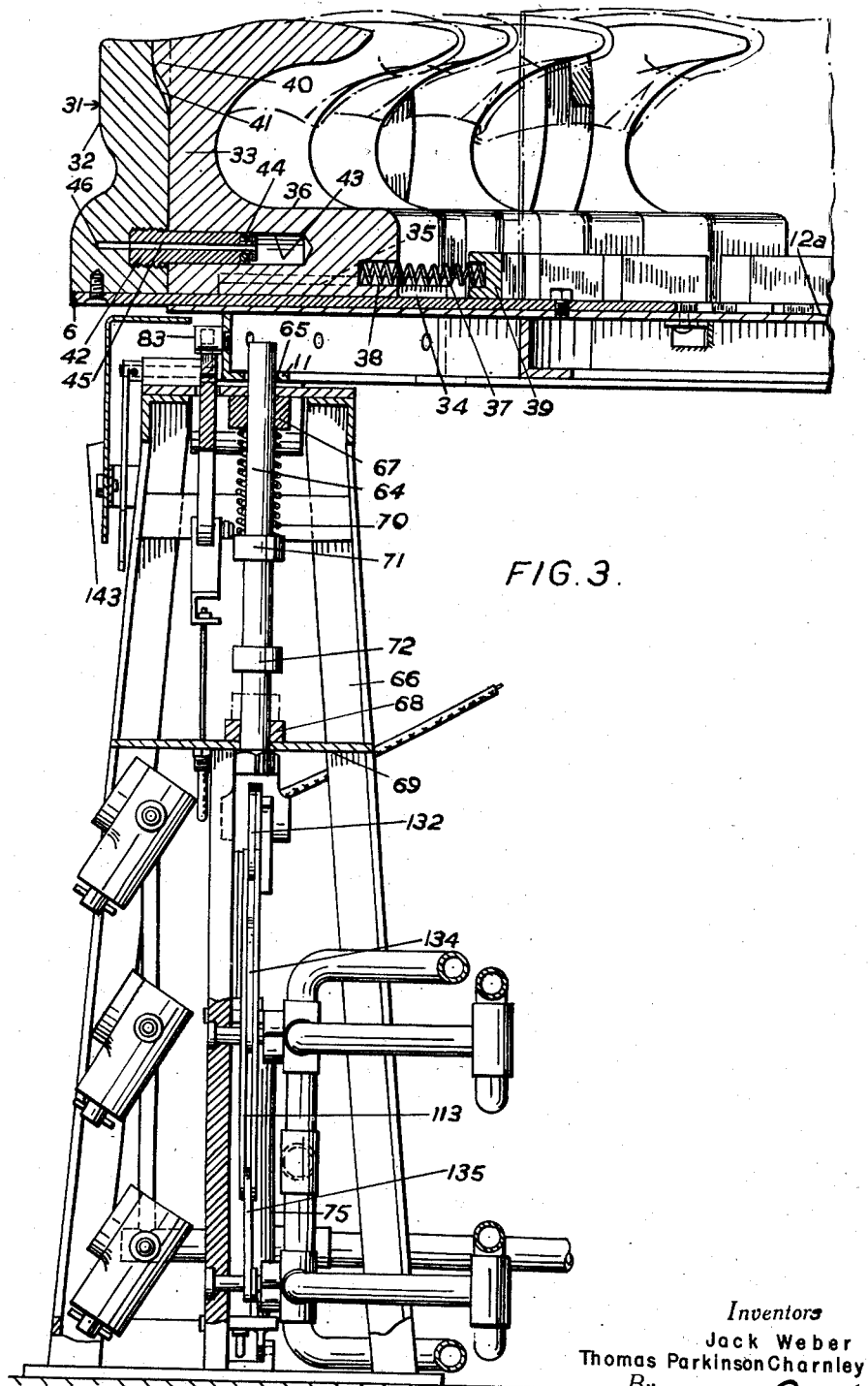
Figure 3 is a vertical section on line III—III, Figure 1.
Figure 4:
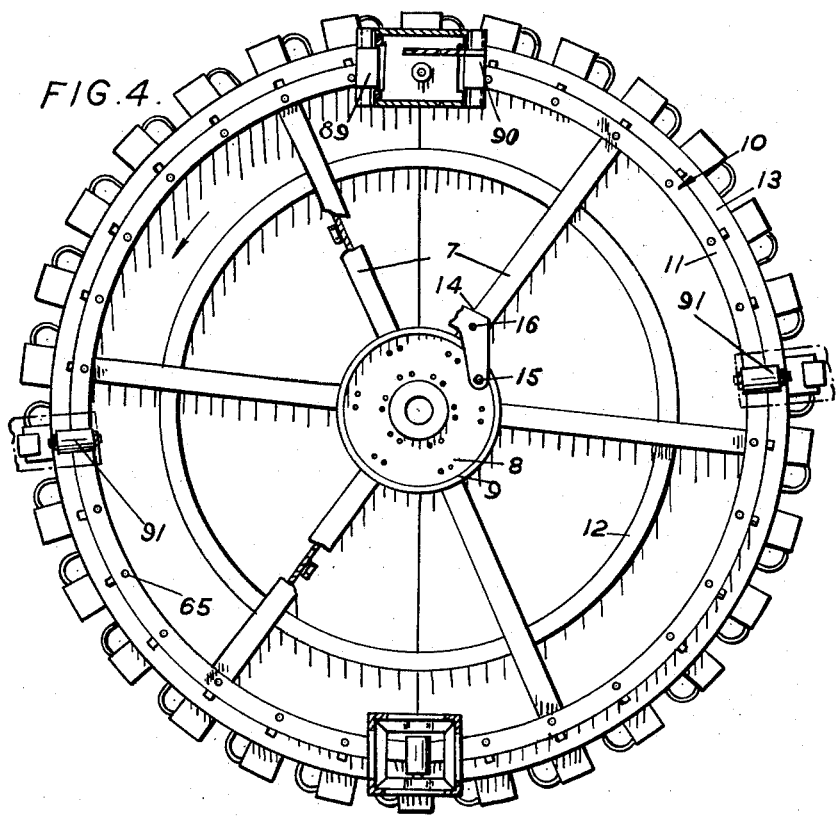
Figure 4 is a horizontal section on line IV—IV, Figure 1; the view being an underneath view of the table of the machine.

Upon the upper part of the pivot post 4 is rotatably mounted the central boss 5 of a circular rotary table generally indicated by the reference 6. This table is in the form of a wheel comprising a plurality of spokes 7 fixed at their inner ends to the upper surface of a drum 8 secured to or formed integrally with the boss 5 of the table, the drum 8 being coaxial with the boss 5 and having a dependent peripheral flange 9. The spokes 7 are formed of inverted T-girders and are spaced (see Fig. 4) equiangularly around the axis of the boss 5 and have their outer ends secured to an outer ring 10 of angle section, the flange 11 of this ring being at the underside of the ring and extending inwardly as is clearly shown in Figures 3 and 4 for example. The spokes 7 are also braced by an intermediate ring 12 (Figure 4).

The wheel formed by the spokes 7 and the rings 11 and 12 is covered on its upper side by a circular metal plate 12a (see Figure 3) upon which is co-axially fixed a further and larger circular plate 13 conveniently formed in two halves; the plate 12a is secured to the rim 11 and spokes 7 in any suitable way as, for example, by welding whilst the plate 13 may be screwed to the plate 12a.

The drum 8 is much less in diameter than the rotary table 6 and the latter is adapted to be driven intermittently through the medium of a one-way driving mechanism acting on the flange 9 of the drum 8 and comprising a horizontal arcuate driving arm 14 (Figures 1, 2, 4, 5 and 8). The arm 14 is guidedly supported upon the pedestal 1 and is furnished at one end with a pair of vertically spaced pins or dogs 15 and 16 which may be furnished with rollers (such as the roller 17 shown on the pin 16), the pins or dogs 15 and 16 being arranged respectively on the inside and on the outside of the peripheral flange 9 of the drum 8.

When, in making its driving stroke, the arm 14 is moved (in the direction of the arrow on the arm in Figure 2) about the axis of rotation of the table 6, the pins or dogs 15 and 16 on the arm 14 are adapted to grip the flange 9 of the drum 8 between them so that the drum and the table 6 will be carried around with the arm 14. However, when the arm 14 is moved in the opposite direction to that indicated by the said arrow, it will travel alone without the table 6.

The driving arm 14 is floatingly mounted on the pedestal 1 and has its end 18 (remote from the pins or dogs 15 and 16) connected to one end of a piston rod 19 carried by a table driving piston 20 reciprocably mounted in a pneumatic cylinder 21 arranged below the rotary table 6 with its axis parallel to the upper surface of this table, the end of the cylinder 21 remote from that from which the piston rod 19 projects being pivotally connected at 22 to a bracket 23 fixed to the pedestal 1. Thus the cylinder 21 and the parts associated therewith are pivotal about the vertical axis of the pivot 22 to accommodate the rotational movement of the driving arm 14 about the axis of the table 6.

The cylinder 21 is a double-acting one and compressed air is supplied as required to its opposite ends respectively by air lines 24 and 25 which are alternatively placed in communication with the air supply lines and the atmosphere via a valve chest 26 having a reciprocable double ended control valve 27 adapted alternately to cut off the supply of compressed air to one of the lines 24, 25 and to supply the other of these lines with compressed air whilst at the same time placing the line 24 or 25 to which the air supply has been cut off in communication with an appropriate exhaust passage 24' or 25' in the valve chest 26.

Figure 2:
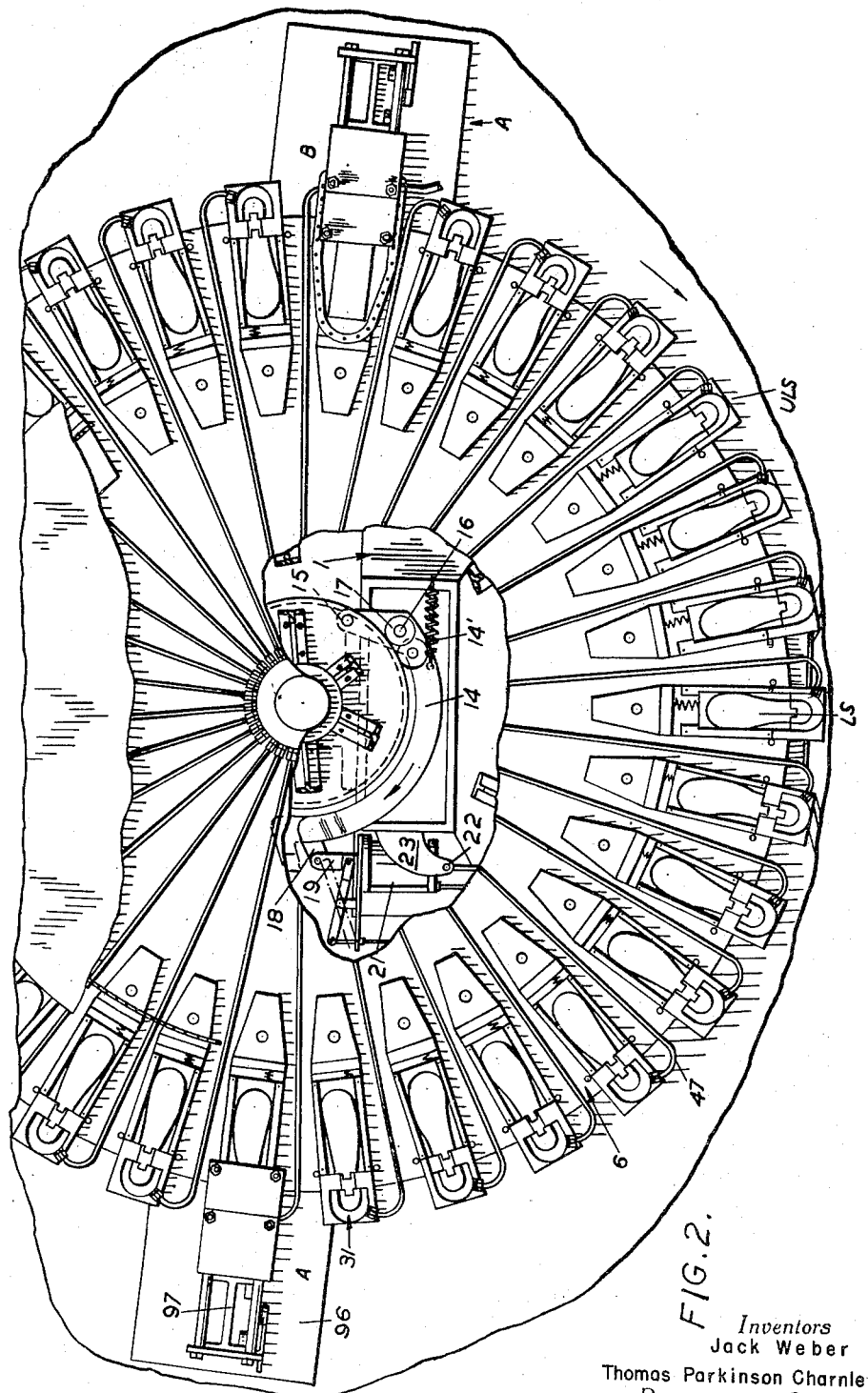
Figure 2 is a part sectional plan of the machine shown in Figure 1, a portion of the table being omitted in this figure.

When pressure is supplied to the pivoted end of the cylinder 21 the driving piston 20 is forced outwardly and causes the driving arm 14 first to pivot about the pin or dog 15 which bears on the inside of the flange 9 of the drum 8. This movement of the arm causes the pin or dog 16 to grip the outer periphery of the flange 9 and thereafter further outward movement of the piston 20 causes the driving arm 14 to move bodily in a clockwise direction about the axis of the table 6 (as the latter is seen in Figures 2 and 8, for example), this movement of the arm 14 producing a corresponding step of rotary movement in the table 6. When the piston 20 is again withdrawn into the cylinder 21 by exhausting the pivoted end of the cylinder 21 and admitting compressed air to the opposite end of the latter, the arm 14 returns to its original position, i. e. that approximately shown in full lines in Figures 2 and 8, leaving the table 6 behind during this movement. The return of the arm 14 is assisted by a spring 14', see Figure 2.

The piston rod 19 also controls the action of a stop catch 28 for the rotary table 6 through a flexible control 29 such as a Bowden cable, one end of this cable being connected to the stop catch 28 and the other end to the piston rod 19. The arrangement and operation of this stop mechanism will be more fully described below.

On the upper side of the rotary table 6, and arranged in a ring adjacent the periphery of the table, is a plurality of upstanding shoe lasts, generally indicated by the reference 31, equiangularly spaced about the centre of the table 6. The foot parts of the lasts are uppermost and extend radially inwardly with respect to the rotary table 6. The lasts 31 are made of rigid material such as for example steel.

In order that each last may be adjusted to fit any shoe, within a predetermined range of sizes, placed thereon and without the use of soft or flexible inflatable parts such as cushions or bags, each last is made so that it can be expanded or contracted in the direction of the length of its foot part i. e. radially with respect to the rotary table 6. Thus each last is formed, as is clearly shown in Figure 3 for example, in two rigid parts, namely a heel part 32 and a sole or fore part 33, the heel part being rigidly secured to the upper surface of the table 6 at the outer periphery thereof and the sole part 33 being mounted for radial sliding movement on the table 6.

To provide for the radial adjustment of the fore part of each last, a pair of laterally spaced parallel guides 34 are fixed to the upper surface of the table for the last and longitudinal flanges 35, arranged one on each side of the base 36 of the fore part of the last, are arranged to slide in the corresponding guides 34. Thus the fore part 33 of each last can move inwardly away from the heel part 32 of the last and back again to its original position, the inward movement of the forepart of the last being effected by pneumatic means, as will be described, and the return movement of the fore part of the last being effected by one or more springs 37 bearing at one end upon the bottom of a recess 38 in the base of the fore part of the last and at the other end against a fixed abutment 39 on the table 6.

At the upper portion the fore part of each last has an outwardly directed key portion 40 adapted to engage, when the last is closed or contracted, in a corresponding keyway 41 in the heel part of the last so as to assist in positioning these two parts of the last in proper radial alignment.

Into the heel part 32 of each last is screwed the outer end of a plunger 42 (see Figure 3) extending horizontally and radially inwardly from the heel part 32 with respect to the table 6, the plunger 42 extending into a corresponding horizontal bore 43 (forming a pneumatic cylinder) provided in the base part 36 of the fore part 33 of the last. The inner end of the plunger 42 is provided with a packing washer 44 and constitutes a piston reciprocable in the cylinder 43. The plunger 42 is fixed and the cylinder 43 is movable relatively thereto, the movement of the cylinder 43 towards the centre of the rotary table 6 being effected by admitting air under pressure into the cylinder 43 via an axial bore 45 in the plunger 42. The bore 45 is connected at its outer end to an angled passage 46 through the heel part 32 of the last and the outer end of this passage 46 is connected to the outer end of a pipe 47 supported on the table 6 and extending substantially radially of the latter and having its inner end connected, as shown clearly in Figure 5, to a union 48 fixed radially into the periphery of an approximately cylindrical valve housing 49 fixed coaxially to, and rotating with, the boss 5 of the table 6.

Figure 6:
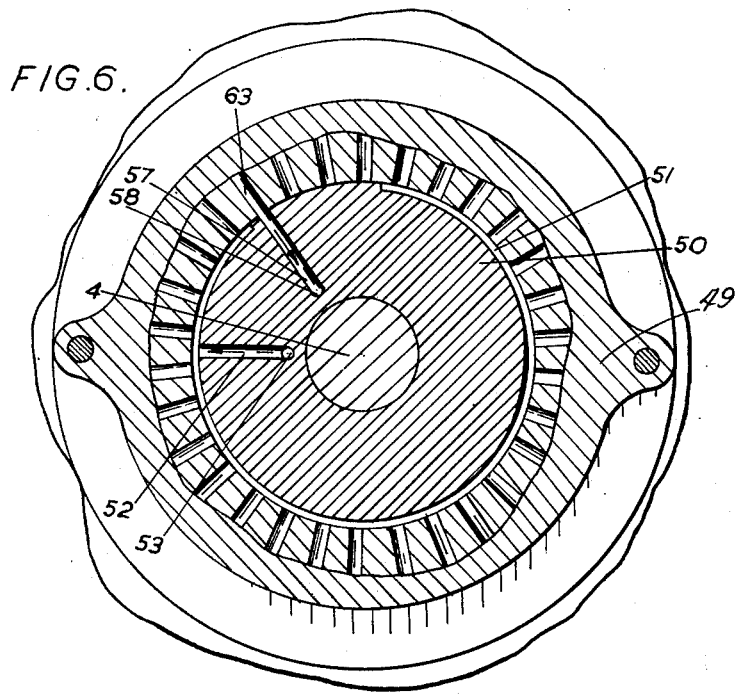
Figure 6 is a sectional plan on line VI—VI, Figure 5.

The upper end of the pivoting post 4 projects above the boss 5 of the table 6 and into the valve housing 49, this upper end of the post 4 being reduced in diameter to receive and support an annular valve 50 hereinafter called the "last-expansion control valve." This valve is non-rotatably mounted on the post 4 and is coaxial therewith; it consists of an externally frusto-conical collar which is, as is clearly seen from Figure 6, furnished with a peripheral groove 51 extending less than completely therearound. Near one end the groove 51 communicates with a radial inlet passage 52 formed in the valve 50 and itself communicating at its inner end with a vertical eccentrically located inlet passage 53 through the body of the valve 50 and connected to a vertical passage 54 extending through the post 4 and in turn connected to a radial inlet passage 55 passing outwardly through the post 4 and the boss 3 on the pedestal 1, this radial passage 55 being connected to a compressed air supply line 56.

The last-expansion control valve 50 is also provided with a radial exhaust passage 57 exhausting to the atmosphere via a passage 58 through the post 4, this passage 50 exhausting directly to the atmosphere.

The valve housing 49 is internally of frusto-conical form so as to be a close rotatable fit upon the last-expansion control valve 50 and is pressed downwardly upon the latter by means of springs 59 operating between a pair of pressure plates 60 and 61 mounted upon a stud 62 screwed into the upper end of the pivoting post 4 and passing freely through the plates 60 and 61, the latter of which bears upon the top of the valve housing 49.

The valve housing 49 is furnished with a plurality of radial ports 63, there being one of these ports for each last 31 and the unions 48 for the pipes 47 leading to the lasts being screwed respectively one into each of the ports 63. Thus the arrangement is such that, as the rotary table 6 (together with the valve housing 49) rotates around the post 4 and the last-expansion control valve 50, each of the ports 63 is for a substantial part of the rotation of the table in communication with the peripheral groove 51 in the control valve 50 so that compressed air is supplied to the cylinder 43 of each of these lasts for expanding the last in a direction radial to the table 6, whilst eventually (during each revolution of the table 6) each last cylinder 43 will in turn be cut off from the compressed air supply and placed in communication with the exhaust passage 57 through the control valve 50 as will be clear from Figure 6, the spring or springs 37 of the exhausted last then assuming supremacy and closing or contracting the last.

Conveniently one position around the periphery of the table 6 is regarded as the "loading" position or station at which a shoe is placed on the last. Another station, herein referred to as the "unloading" station is arranged at an angular distance (measured backwardly of the rotational direction of movement of the table 6) from the loading station, and the arrangement is such that as each last reaches the unloading station it will be contracted and will remain contracted as it passes to and reaches the loading station, the last only being re-expanded on leaving this latter station. Thus, as clearly shown in Figure 2 and diagrammatically illustrated in Figure 8, the lasts 31 are all expanded except when they are disposed at and between the unloading and loading stations, the unloading station being marked in the drawings by the letters ULS and the loading station by the letters LS. It is therefore upon the angular spacing of the loading and unloading stations that the peripheral length of the groove 51 in the last-expansion control valve 50 depends.

Preferably the loading station is at the centre of the front of the machine and, assuming that the table 6 is rotating in a clockwise direction as in the machine illustrated in top plan in the drawings, the unloading station is to the right of the loading station, there conveniently being four lasts between the loading and unloading stations including those at these two stations.

The table 6 is adapted to bring each last in turn to the loading station LS and then to remain stationary for an interval to permit the loading of the last. Simultaneously a last at the unloading station may be unloaded and certain other operations may be performed on shoes on the lasts at other positions around the table. When a loaded last moves from the loading station it is expanded to fill the shoe thereon and remains so expanded until it has almost completed its circular path from the loading to the unloading stations, the last then being permitted to contract so as to free the shoe for removal from the last at the unloading station and the last then remaining contracted until it reaches and subsequently leaves the loading station.

It will be understood that it is not essential that all shoes operated upon successively need be of the same size for the lasts are expanded by yielding pressure and are automatically self-accommodating to the shoes and only expand until the shoes are adequately gripped by the lasts, the normal resistance of the shoes to stretch being sufficient to retain the lasts against further automatic expansion.

Means are provided for locking and subsequently releasing the rotary table 6 each time it brings a last into the loading station. In the arrangement shown in the drawings this locking of the table is effected by a vertically disposed locking bolt 64 (Figures 1, 3 and 8) which is adapted to engage at its upper end in any one of a series of holes 65 provided in the flange of the rim 11 of the rotary table 6, there being one of these holes below and for each of the lasts 31 and the arrangement being such that the bolt 64 will, when the last is brought into the loading station, engage in a hole 65 in the table 6 to lock the latter temporarily against rotation, the bolt subsequently being withdrawn to release the table for one further step in its rotary movement under the action of the driving arm 14.

The bolt 64 is supported vertically adjacent the periphery of the table 6 at the front thereof below the loading station, the bolt being carried in a pedestal 66 disposed below the table and resting upon the ground. The pedestal 66 is conveniently independent of the central pedestal 1 of the machine although it could, if desired, be associated therewith.

The bolt 64 is carried at its upper end in a bearing 67 in the pedestal 66 and adjacent its lower end in a bearing 68 on a cross member 69 of the same pedestal. The downward movement of the bolt 64 is assisted by a spring 70 mounted on the bolt and engaging at one end of the bearing 67 and at the other end with a collar 71 adjustably fixed to the bolt. The extent of the downward movement of the bolt is controlled by a collar 72 which may be adjustable on the bolt and which is adapted to abut against the bearing 68.

The lower end of the bolt 64 is conected to the upper end of the piston rod 73 of a double-acting locking piston 74 mounted for vertical reciprocation in a vertically disposed pneumatic locking cylinder 75 mounted on the base 76 of the pedestal 66. The upper end of the cylinder 75 is alternately supplied with compressed air and exhausted via a pipe line 78 and the lower end is alternately supplied with compressed air and exhausted via a pipe line 77 (see Figures 1 and 8 for example). When pressure is applied to the upper side of the piston 74 the bolt 64 is withdrawn whilst when pressure is applied to the under side of the piston 74 the bolt 64 is forced upwardly (against the action of the spring 70) to engage in one of the holes 65 in the table 6 temporarily to lock the latter against rotation.

The pipe lines 77 and 78 are respectively connected to the pipe lines 25 and 24 previously described in referring to the pneumatic cylinder 21 used in driving the table, these connections being diagrammatically illustrated in Figure 8.

To ensure that the table 6 will come to rest with one of the holes 65 opposite the bolt 64 each time the table reaches the end of one of its rotary steps, the stop catch 28 (previously referred to) is provided. This stop catch is in the form of a lever pivoted at 79 to the upper part of the pedestal 66 for swinging movement in a vertical plane, the lever 28 being provided with a nose 80 (Figures 1 and 3) inclined on its underside 81 and having a notch 82 in its upper side, this notch being adapted for successive engagement with a series of cylindrical projections or stop pins 83 projecting radially at uniform intervals from the outer surface of the rim 11 of the table 6. These radial stop pins are conveniently in the form of socket screws and one of these stop pins is provided for each of the lasts 31 on the rotary table 6 and in such a position that, when one of the pins 83 is engaged in the notch 82 of the catch lever 28, the corresponding hole 65 in the rim 11 of the table is in register with the bolt 64.

The stop catch lever 28 is urged upwardly by a spring 88 (Figure 1) but is adapted periodically to be depressed to disengage it from the stop pins 83, this depression of the stop lever 28 being effected by means of the inner cable of the Bowden wire 29 previously described. The said inner cable is operated from the table driving piston 20 through a double-ended lever 30 (Figure 8), the arrangement being such that the catch lever 28 serves temporarily to engage a stop pin 83 and hold the table stationary at the end of each rotary step until the bolt 64 has engaged a hole 65 in the table and locked the table in a stationary condition. However, during the latter part of the return strokes of the driving piston 20 and the driving arm 14 (after the table has been locked by the bolt 64) the Bowden wire 29 withdraws the stop catch 28 to the position shown in Figures 1 and 8 thus releasing the table for its next forward step as soon as the bolt 64 is withdrawn. By providing for appropriate lost motion in the connection between the cable 29 and the stop catch lever 28 it is possible to ensure that the withdrawal of the stop catch lever 28 will not be effected, as described, until towards the latter part of the return stroke of the driving arm 14 i. e. until a moment just preceding the next advance movement of the table.

After its withdrawal, the stop catch lever 28 is retained temporarily in the withdrawn position by means of a biased, e. g. weighted or spring loaded, trip lever 84, this withholding of the catch lever 28 permitting the table 6 to rotate, after the withdrawal of the bolt 64, sufficiently to clear the stop pin 83 last engaged with the catch lever 28 and lying immediately over the notch 82 in this lever, from this position.

The trip lever 84 is pivoted at 85 to the pedestal 66 so as always to tend to move into a position in which a lip 87 at the upper end of the trip lever 84 is engaged over the pointed free end 86 of the stop catch 28. Thus as soon as the stop catch 28 is withdrawn to the position shown in Figure 1, the trip lever 84 swings into position to lock the stop catch lever 28 in this withdrawn condition.

Figure 1:
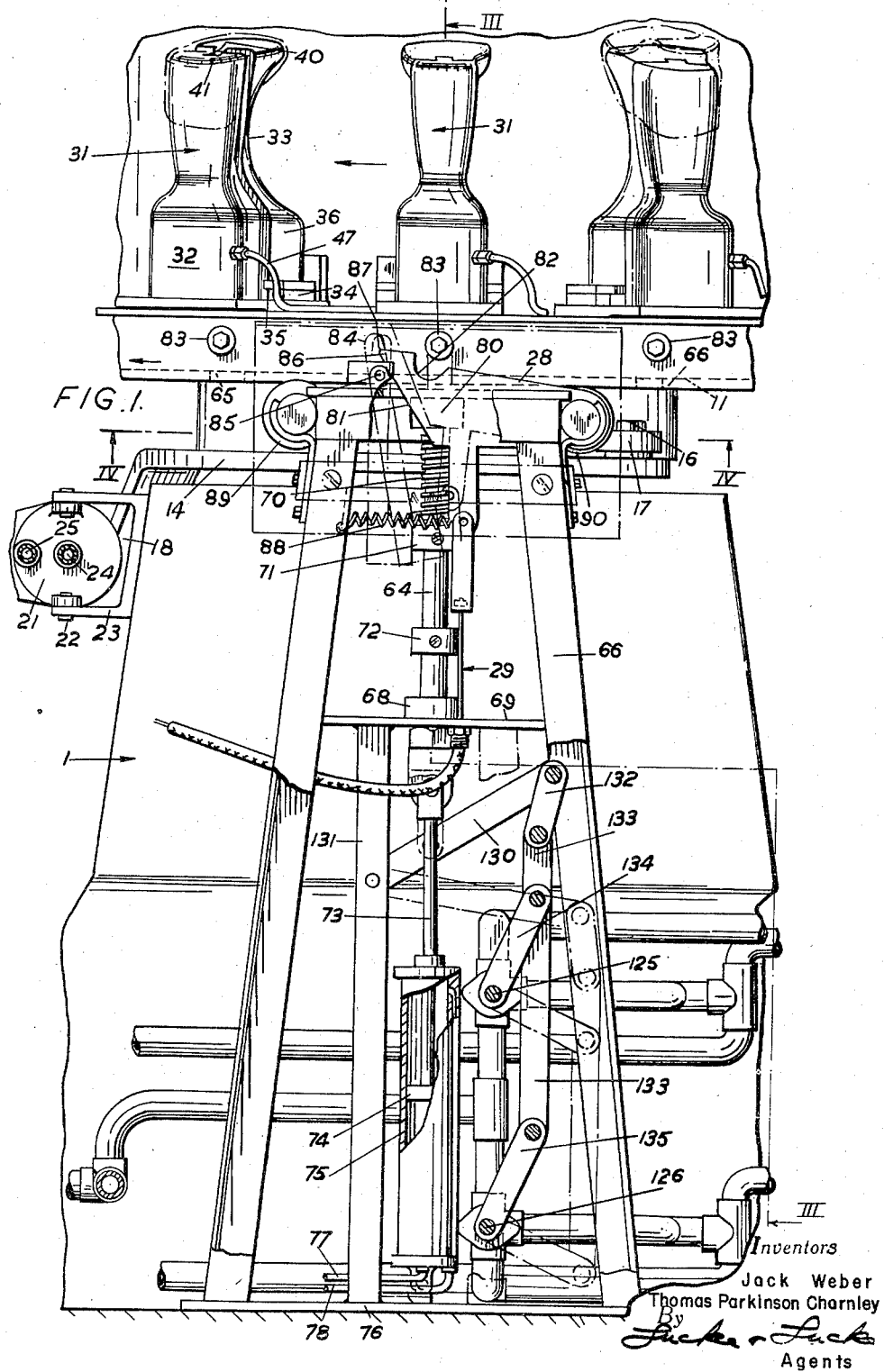
Figure 1 is a part sectional front elevation of a pneumatically operated machine for use in the manufacture of shoes, the machine being constructed in accordance with this invention and the figure showing only a portion of the rotary table of the machine.

When the trip lever 84 is in the said stop catch lever locking position, the upper end of the trip lever projects, as shown in Figure 1, above the nose of the stop catch 28 into the path of the oncoming stop pins 83 so that, shortly after a stop pin 83 has passed forwardly from the vicinity of the notch 82 in the stop catch lever 28, this stop pin strikes the upper end of the trip lever 84 and causes this lever to swing upon its pivot to release the stop catch lever 28 and so permit the same to be moved upwardly by its return spring 88 into position to receive in its notch 82 the succeeding stop pin 83, thereby to arrest the rotation of the table 6 with a hole 65 therein in alignment with the bolt 64.

At the loading station the table 6 is steadied and supported from below by rollers 89 and 90 supported in bearings at the upper end of the pedestal 66, these rollers bearing on the inturned flange of the rim 11 of the table. The table may be similarly supported by other rollers at other positions if desired, there preferably being at least one such roller 91 at each of the processing or operating stations subsequently referred to and as indicated in Figure 4.

At one or more appropriate positions around the table is or are arranged one or more processing or operating stations at which manufacturing operations or steps may be carried out on the shoes as they are successively presented to this station or stations. Thus in the machine illustrated in the drawings two processing stations are provided, these stations being shown in plan in Figure 2 and also diagrammatically in Figure 8. A side elevation of one of the stations is also shown in Figure 7.

For convenience the two processing stations are marked in Figures 2 and 8 as stations A and B; these stations are arranged approximately diametrically opposite one another at the periphery of the rotary table 6 and approximately each at 90 degrees to the loading stations, the unloading station being located between the processing station B and the loading station LS.

Figure 7:
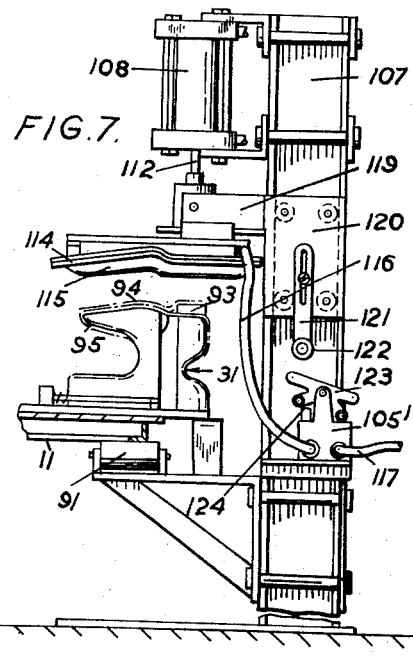
Figure 7 is a side elevation of one of the processing stations looking in the direction of arrow A, Figure 2.

The machine shown in the drawings is illustrated, in Figure 7 in particular, as being employed in the application of a heel piece 93 and a through-sole 94 to the bottom of a shoe 95, the heel piece 93 being applied to the shoe before the through-sole 94 is fixed thereto. With such an arrangement the shoe is placed on a last by an operator at the loading station, the last is automatically expanded as it leaves the loading station, an adhesive is applied by an operator either to the heel piece 93 or to the heel part of the bottom of the shoe or to both these parts prior to the shoe reaching the first processing station A; then the operator applies the heel piece to the heel part of the bottom of the shoe and processing station A serves to apply pressure to the heel piece and ensure that the latter is properly adhered to the bottom of the shoe. The shoe then continues in its circular movement about the axis of the rotary table and before it reaches the processing station B an operator applies adhesive to the sole and shank portions of the bottom of the shoe and the upper surface of the heel piece 93 or to the under surface of the through-sole 94 or to both the shoe and the through-sole and then applies the latter to the bottom of the shoe. When the shoe reaches the processing station B pressure is applied to the through-sole at this station and the affixing of the through-sole to the shoe is completed. The shoe now passes to the unloading station where it is removed from its last, the latter having been contracted before reaching the unloading station so as to free the shoe for removal.

It will be understood that other processing steps may be effected between the loading and unloading stations besides those mentioned, and that the order of effecting even the steps of processing described can be reversed if desired. For example, in addition to the processing steps specifically above described buffing or scouring, grinding or trimming operations may be performed upon the shoe.

Assuming that only two processing stations are employed and that they are for the purposes referred to above, then conveniently the station A is constructed as follows. Upon a base plate 96 fixed to the floor or carried by the base or other part of the main pedestal 1 of the machine is an upstanding pillar 97 at the upper end of which is fixed a pneumatic double-acting cylinder 98 having its axis vertically disposed. In this cylinder is a double-acting piston 99 reciprocable in the cylinder alternately in opposite directions under the pressure of compressed air admitted alternately to opposite ends of the cylinder via air lines 100 and 101 (see Figure 8), these lines alternately being used for the supply of air to, and for the exhausting of air from, their respective ends of the cylinder 98.

The piston 99 has a vertically disposed piston rod 102 guided by an appropriate bracket 103 and carrying at its lower end a pressure pad 104 by which a heel piece, such as 93, can be pressed upon the bottom of the shoe as hereinbefore described. The bracket 103 may be adapted to ride up and down the pillar 97 and may automatically control a valve 105 for pad inflating purposes when the pressure pad 104 is in the form of an inflatable cushion, as it may be, or when the processing station used at A is of the type illustrated in the drawings as being located at the station B. Thus by providing the valve 105 at the station A as well as providing a similar valve at station B, the two stations may be interchanged if desired. Air is led to the pad inflating valve 105 by means of an air line 106.

In the main the processing station B is similar to the station A and includes a rigid vertical pillar 107 on which is supported a vertically disposed hydraulic cylinder 108 having a double acting piston 109 reciprocably mounted therein, the cylinder 108 being alternately supplied with compressed air and exhausted at opposite ends through pipe lines 110 and 111 respectively connected to the pipe lines 101 and 100. To the lower end of the piston rod 112 of the piston 109 is fixed a pressure pad or cushion 113 (see Figure 7) comprising a transverse back plate 114 and a suitably shaped inflatable envelope 115 adapted to engage the through-sole 94 (when the said pad or cushion 113 is caused to descend) and so to cause the through-sole closely to follow the contour of the sole and heel of the shoe 95 located under the pad or cushion.

The pad or cushion 113 is preferably pneumatically inflated, compressed air for this purpose being supplied to the pad or cushion via a flexible air line 116 connected to a pad inflating valve 105' in turn connected by an air supply line 117 to the air line 56 which is in turn connected to the main compressed air supply line 118.

The pressure pad 113 is guided in its upward and downward movement by a bracket 119 on a carriage 120 adapted to ride up and down the pillar 107 as the piston 112 rises and falls, and upon the carriage 120 is adjustably mounted a trip member 121, having a roller 122 at the lower end thereof, this roller being adapted to operate a trigger 123 for actuating a plunger or equivalent device 124 which alternately serves to place the inflatable pad 113 in communication with the air line 117 for inflating the pad and in communication with the atmosphere for exhausting the pad, the arrangement being that when the pad has engaged the through-sole on the shoe the pad is inflated so that the pressure on the through-sole is increased to effect a close union of the through-sole with the shoe whilst, when the pad 113 is withdrawn from the shoe, the pad is automatically deflated at least partially. If the pad 104 of station A is of an inflatable form its inflation and deflation may be effected in the same way as that of the pad 113.

The operation of the pistons 99 and 109 of the stations A and B is controlled by the operation of a pair of rotary control valves 125 and 126 arranged in an air line 127 from which branch the air lines 100 and 101 and which is also connected between the valves 125 and 126 by a line 128, to the main compressed air supply line 118. At its ends the line 127 is connected to an exhaust line 129.

The rotary valves 125 and 126 are both two-way valves, the valve 125 being adapted to place the air line 100 alternatively either in communication with the exhaust line 129 or the compressed air supply line 118 via the lines 127 and 128. Similarly the valve 126 is adapted to place the air line 101 either in communication with the exhaust line 129 or with the supply line 118, and the two rotary valves 125 and 126 are so linked and operated (as will hereinafter be described) that both of the cylinders 98 and 108 are supplied simultaneously with compressed air at the upper ends thereof and both are exhausted simultaneously. It will however be seen that when the upper end of each of the cylinders 98 and 108 is being exhausted, the other end of each such cylinder is being supplied with compressed air, and vice versa so that each time the two valves 125 and 126 are operated the pistons 99 and 109 reverse their direction of movement.

Operation of the valves 125 and 126 is effected in timed relation with the operation of the bolt 64 so that the pistons 99 and 109 of the stations A and B do not descend until a last is located and locked below each of them and so that both these pistons ascend at least partially before the rotary table 6 commences to advance after one of its periods of rest. This interconnection of the bolt 64 and the valves 125 and 126 is effected by means of a lever 130 (see Figures 1, 3 and 8) pivoted at one end to a vertical member 131 of the pedestal 66, the lever 130 being connected at the other end to one end of a link 132 having its other end pivotally connected to a vertical link 133 of a parallel linkage comprising the said link 133 and a pair of lever arms 134 and 135 which are respectively pivotally connected at one end to the link 133 and fixed at the other end to the spindles of the valves 125 and 126.

The lever 130 is connected intermediate its ends to the piston rod 73 of the piston 74 which operates the bolt 64. Thus as the piston 74 ascends to operate the bolt 64 for locking the table 6 against rotation, the rotary valves 125 and 126 are both turned in an anti-clockwise direction as these valves are seen in Figures 1 and 8, whereas when the bolt 64 is withdrawn by the piston 74 the rotary valves 125 and 126 are turned in the opposite sense, i. e. in a clockwise direction into the dash and dot position indicated in Figure 1.

When the lever arms 134 and 135 are moved to their uppermost positions (full line positions Figure 1) the rotary valves 125 and 126 occupy the position shown in Figure 8 so that the undersides of the pistons 99 and 109 of the cylinders 98 and 108 are open to exhaust and cut off from the compressed air supply. On the other hand the upper sides of the pistons 99 and 109 are cut off from exhaust and open to the compressed air supply so that the pistons 99 and 100, and the parts associated therewith, are caused to descend.

When the position of the valves 125 and 126 is reversed by the clockwise movement of the lever arms 134 and 135 to the dot-and-dash position, the aforementioned state of affairs is reversed and the lower sides of the pistons 99 and 109 are opened to the compressed air supply line and the upper sides of these pistons are open to exhaust so that the pistons 99 and 100 will ascend.

It will thus be apparent that the pressure pads 104 and 113 are automatically brought into operation and withdrawn from operation respectively on the locking of the table 6 against rotation and before the latter commences again to rotate, the mechanism being timed so that the bolt 64 first locks the table before the pressure pads 104 and 113 make a full descent and so that these parts commence their ascent before the table is unlocked for rotation.

Pressure gauges 137, 138 and 139 are preferably provided in the pipe lines 56, 117 and 118 respectively. Similar gauges 140 and 141 may be provided in the pipe lines 101 and 110.

The admission of compressed air and the reversal of its flow through parts of the circuit as above described may be effected by a manually operated valve e. g. a foot operated valve but is preferably, as indicated in Figure 8 of the drawings, automatically controlled, there being a main valve by which the compressed air may be cut off and the whole apparatus brought to rest when desired. This main control valve is in the pipe line 118 and is indicated at 142 in Figure 8, the valve being on a control panel or plate 143 conveniently supported at the front of the machine on the pedestal 66 as shown in Figure 3.

The automatic control of the apparatus is effected by means of the control valve 27 previously referred to, which is reciprocable in the pneumatic chest or cylinder 26. Between the piston ends 144 and 145 of the valve 27 the cylinder 26 communicates with the compressed air supply pipe 118 so that air is constantly admitted to the cylinder 26 between the pistons 144 and 145. When, as shown in Figure 8, the valve 27 occupies the right hand position in the cylinder 26, the air line 24 of the cylinder 21 controlling the rotation of the table is cut off (as shown by one of a pair of collars 27', 27" on the valve 27), from the compressed air supply line 118 placed in communication with the exhaust passage 24' whilst the line 25 to the cylinder 21 is opened to the line 118 and cut off from the exhaust passage 25' so that the piston 20 in the cylinder 21 is returned to its normal position in which the table driving arm 14 is at the beginning of its stroke ready to drive the table. At this stage the table 6 is locked against rotation, compressed air having been admitted from the line 25 via the line 77 to the locking bolt piston cylinder 75 so as to cause the bolt 64 to rise and lock the table 6 against rotation.

In moving to its locking position in this way, the bolt 64 appropriately sets the rotary valves 125 and 126 so that compresesd air may be supplied to the upper ends of the cylinders 98 and 108 via the air lines 101 and 110 and the main supply line 118.

A pair of cylinders 146 and 147 are provided in tandem, the cylinder 146 being a pneumatic reversing cylinder and the cylinder 147 being a hydraulic dashpot containing a hydraulic liquid such as oil. A piston 148 is reciprocably mounted in the reversing cylinder 146 and a similar piston 149 is reciprocably mounted in the dashpot cylinder 147, these two pistons being joined together by a common piston rod 150 furnished between its ends with a collar 151 which may be adjustable along the rod.

The two opposite ends of the reversing cylinder 146 are connected respectively by pipe lines 152 and 153 to the air lines 25 and 24 so that, as the control valve 27 reciprocates in its cylinder or chest 26, air is alternately supplied under pressure to the opposite ends of the cylinder 146 whilst the cylinder is exhausted at the other end. Consequently the piston 148 is caused to reciprocate in its cylinder and carries with it the piston rod 150, the collar 151 and the piston 149. The piston 149, operating in the dashpot cylinder 147, acts as a damper to control the rate of movement of the rod 150, the cylinder 147 having its opposite ends connected by a closed by-pass 154 which includes a regulatable or bleed valve 155 by which the rate of transfer of oil from one end of the cylinder 147 to the other can be adjusted to the desired value.

With the control valve 27 in the position shown in Figure 8, air is admitted from the line 25 via the line 153 to the left hand end of the cylinder 146 to cause the collar 151 to move to the right as these parts are seen in Figure 8. However, when the control valve 27 is moved to the left so as to cut off the air line 25 from the supply line 118 and place the latter in communication with the air line 24, then the bolt 64 is withdrawn to free the table 6 for rotation and the valves 125 and 126 are reversed so that the pistons 99 and 109 are caused to rise in their cylinders 98 and 108. Then the piston 20 operating the table driving arm 14 is caused to make a driving stroke to rotate the table, the stop catch lever 28 having previously been withdrawn but subsequently being automatically re-set for arresting the rotation of the table 6, this re-setting being effected by one of the stop pins 83 striking the trip lever 84 so as to release the stop catch lever 28 to enable it to move into position to engage the next stop pin 83 as previously described.

Also air is admitted under pressure from the line 24 to the right hand end of the cylinder 146 which causes the piston 148 to move to the left and to carry with it the piston rod 150 and the collar 151, the rate of movement of the collar 151 being controlled by the rate of circulation of oil in the cylinder 147 and by-pass 154 which is in accordance with the setting of the valve 155.

The operation of the control valve 27 to effect the reversal of the air flow periodically is brought about by the action of the collar 151 as it reciprocates between the two cylinders 146 and 147, the collar 151 being adapted to strike, as it moves to the right, a plunger 156 in a small cylinder 157 so as to force air or oil under pressure through a line 158 into the right hand end (as seen in Figure 8) of the cylinder or chest 26 to cause the control valve 27 to move to the left, whilst on the movement of the collar 151 to the left it is adapted to strike a plunger 159 operating in a small cylinder 160 to force air or oil through a line 161 into the left hand end of the cylinder or chest 26 to move the valve 27 to the right, i. e. into the position shown in Figure 8. Thus so long as the control valve 142 is open, the machine continues to operate and the table 6 advances step by step, being locked at the end of every rotational step to enable a shoe to be placed on the contracted last at the loading station and to enable the finished shoe to be removed from its contracted last at the loading station whilst manufacturing operations are carried out at the processing stations.

Immediately the table commences to move from a stationary position the last at the loading station is expanded yieldingly so as to fill the length of the shoe placed thereon, full expansion of the last being determined by the size of the shoe.

We claim:

1. A machine for use in the manufacture of shoes, such machine comprising a plurality of mutually spaced lasts each adapted to receive a shoe to be operated on; at least two relatively movable parts forming each last so that each last is expansible in the direction of its length whereby it can be adapted to fit shoes of varying sizes within a predetermined range of sizes; a rotary table for carrying said mutually spaced lasts, said rotary table being adapted to be rotationally advanced step by step, said lasts being arranged at equi-angularly spaced intervals around the axis of rotation of the table; fluid pressure operated means for causing said step by step rotary advancement of said rotary table; fluid pressure operated means for automatically expanding each last in turn after the loading thereof to adjust the length of the last to suit the size of shoe placed thereon; a rotary valve for regulating the supply of pressure fluid to said fluid pressure operated means for expanding the lasts; a rotating part of said valve connected with said table to rotate therewith and having outlet orifices for communication with said fluid pressure operated expansion means of each last; a stationary part of said valve having means for closing at least one of said outlet orifices, said rotating part and said stationary part thereby co-operating to determine which of said last expansion means shall receive pressure fluid to expand the lasts and the period of supply of such pressure fluid supply to the last; and means for automatically contracting each of said lasts as the said table completes each revolution, whereby the shoe on the last may be removed therefrom.

2. A machine for use in the manufacture of shoes, such machine comprising a plurality of mutually spaced lasts each adapted to receive a shoe to be operated on; at least two relatively movable parts forming each last so that each last is expansible in the direction of its length whereby it can be adapted to fit shoes of varying sizes within a predetermined range of sizes; a rotary table for carrying said mutually spaced lasts, said rotary table being adapted to be rotationally advanced step by step, said lasts being arranged at equi-angularly spaced intervals around the axis of rotation of the table; fluid pressure operated means for causing said step by step rotary advancement of said rotary table; fluid pressure operated means for automatically expanding each last in turn after the loading thereof to adjust the length of the last to suit the size of shoe placed thereon; a rotary valve for regulating the supply of pressure fluid to said fluid pressure operated means for expanding the lasts; a rotating part of said valve connected with said table to rotate therewith and having outlet orifices for communication with said fluid pressure operated expansion means of each last; a stationary part of said valve having means for closing at least one of said outlet orifices; said rotating part and said stationary part thereby co-operating to determine which of said last expansion means shall receive pressure fluid to expand the lasts and the period of supply of such pressure fluid supply to the lasts; and at least one spring for urging one of said relatively movable parts of each last towards the other of such parts as the said table completes each revolution, whereby the shoe on the last may be removed therefrom.

3. A machine for use in the manufacture of shoes, such machine comprising a rotary table; a plurality of mutually spaced lasts on said table and each adapted to receive a shoe to be operated on; each said last comprising two relatively movable parts so as to be expansible in the direction of its length; fluid pressure operated means for causing step by step rotary advancement of said rotary table; automatic means for locking said table in a stationary condition at the end of each step in its movement, and for then releasing said table for further movement; fluid pressure operated means for automatically expanding each last in turn after the loading thereof to adjust the length of the last to suit the size of shoe placed thereon; a rotary valve for regulating the supply of pressure fluid to said fluid pressure operated means for expanding the lasts; a rotating part of said valve, being connected with said table to rotate therewith and having outlet orifices for communication with said fluid pressure operated expansion means of each last and a stationary part of said valve having means for closing at least one of said outlet orifices; said rotating and stationary valve parts, thereby co-operating to determine which of said last expansion means shall receive pressure fluid to expand the lasts and the period of supply of such pressure fluid supply to the lasts; and at least one spring for urging one of said relatively movable parts of each last towards the other as each last returns to an unloading station, whereby the shoe on the last may be removed therefrom.

4. A machine for use in the manufacture of shoes, such machine comprising a traversable carrier; a plurality of mutually spaced lasts mounted on said carrier and each adapted to receive a shoe to be operated on; each said last comprising two parts, one of which is fixed to said carrier and the other of which is movable relatively to the first part thereby to enable the last to be expanded in the direction of its length; fluid pressure operated means for traversing said carrier intermittently to move said lasts successively from and then back to a loading station; fluid pressure operated means for automatically expanding each last in turn after the loading thereof to adjust the length of the last to suit the size of shoe placed thereon, and means for automatically contracting each of said lasts as it returns to said loading station whereby the shoe may be removed therefrom.

5. A machine for use in the manufacture of shoes, such machine comprising a rotary table, a plurality of mutually spaced lasts arranged around the perimeter of said table and each adapted to receive a shoe to be operated on; each such last comprising at least two parts, one of which is fixed to the said table and the other of which is movable relatively to the latter thereby to enable the last to be expanded or contracted in the direction of its length; means for advancing the said table rotationally step by step thereby to bear said lasts successively around a closed circuit from and back to a loading station; fluid pressure operated means for operating said table advancing means; fluid pressure operated means for automatically expanding each of said lasts in turn after the loading thereof to adjust the length of the last to suit the size of shoe placed thereon; and means for automatically contracting each of said lasts as it returns to said loading station whereby the shoe on said last may be removed therefrom.

6. A machine for use in the manufacture of shoes, such machine comprising a support; a horizontal rotary table on said support; a plurality of lasts on said table and equiangularly spaced around the axis of rotation thereof; each of said lasts being formed in at least two parts movable relatively to one another in the direction of the length of the last; fluid-pressure-operable last expansion means on each of said lasts for separating the said parts thereof thereby to expand the last; fluid-pressure-operable means for advancing said rotary table step by step to bring the said lasts successively to a loading position; valve means, actuatable by rotation of the said table, to admit pressure fluid successively to the fluid-pressure-operable means of the said lasts to expand the latter as they leave the said loading position, and also adapted, prior to the return of each last to the said loading position, to relieve the said fluid-pressure-operable last expansion means of the last of fluid pressure; means for closing the said last parts together when the said fluid-pressure-operable last expansion means are relieved of fluid pressure; fluid-pressure-operable table-locking means for temporarily locking the said rotary table against rotation at the end of each rotational advancement thereof; and control valve means for effecting the application of table-advancing fluid pressure to the said table-advancing fluid-pressure-operable means thereby rotationally to advance the table and for subsequently relieving such means of said table-advancing pressure after each rotational advancement of the table, and for also controlling, in appropriate sequence, the application of fluid pressure to, and then the removal of such pressure from, the said fluid-pressure-operable table-locking means, whereby the said rotary table is advanced rotationally step by step and temporarily locked against rotation after each such advancement step.

7. A machine for use in the manufacture of shoes, such machine comprising a support; a horizontal rotary table on said support; a plurality of lasts on said table and equiangularly spaced around the axis of rotation thereof; said lasts each being formed in at least two parts movable relatively to one another in the direction of the length of the last; fluid operable piston and cylinder-actuated last expansion means on each of said lasts for separating the said parts thereof thereby to expand the last; fluid pressure operable piston and cylinder means for rotationally advancing said rotary table step by step to bring said lasts successively to a loading position; means for temporarily locking said table against rotation after each rotary step of the table; fluid pressure actuated piston and cylinder means for operating the said table-locking means; valve means, actuatable by rotation of said table, to admit pressure fluid successively to the said piston and cylinder last expansion means of the lasts to expand the lasts as they leave the said loading position, and also adapted, prior to the return of each of the lasts to the said loading position, to interrupt the flow of pressure fluid to said piston and cylinder last expansion means of the last and to relieve such means of fluid pressure; means for closing the said last parts together when the said piston and cylinder means thereof are relieved of fluid pressure; and control valve means for alternately effecting the application of table-advancing fluid pressure to the said table-rotating piston and cylinder means for rotationally advancing the table intermittently, and for relieving such piston and cylinder means of said table-advancing pressure after each rotational advancement step of the table, such valve means also being adapted to control the application of fluid pressure to, and then the removal of such fluid pressure from, the said fluid pressure operable piston and cylinder means of said table-locking means, whereby the said rotary table is advanced rotationally step by step and locked temporarily against rotation after each such advancement step.

8. A machine for use in the manufacture of shoes, such machine comprising a support; a horizontal rotary table on said support; a plurality of lasts on said table and equiangularly spaced around the axis of rotation thereof; said lasts each being formed in at least two parts movable relatively to one another in the direction of the length of the last; fluid operable piston and cylinder-actuated last expansion means on each of said lasts for separating the said parts thereof thereby to expand the last; a reciprocable one-way-acting driving arm for rotationally advancing said rotary table step by step to bring the said lasts successively to a loading station; fluid pressure operable double-acting piston and cylinder means for reciprocating said driving arm; valve means, actuatable by rotation of said table, to admit pressure fluid successively to the said piston and cylinder last expansion means of the lasts to expand the lasts as they leave the said loading position, and also adapted, prior to the return of each of the lasts to the said loading position, to interrupt the flow of pressure fluid to said piston and cylinder last-expansion means of the last and to relieve such means of fluid pressure; spring means for closing the said last parts together when the said piston and cylinder means thereof are relieved of last expanding fluid pressure; locking means for temporarily locking the said rotary table against rotation at the end of each rotational advancement step thereof; fluid pressure-operable piston and cylinder means for actuating the said table-locking means; and control valve means for effecting the application of fluid pressure alternately to the opposite ends of the cylinder of the said double-acting piston and cylinder-driving-arm reciprocating means alternately to cause the said arm to rotate the table and then to return to its initial position, and for also effecting the alternate application of table-locking fluid pressure to the said fluid pressure operable piston and cylinder means of the said table-locking means thereby to effect the locking of the table after each advancement step and then the removal of such table-locking pressure to permit the unlocking of the table preparatory to each advancement step.

9. A machine according to claim 8, wherein the said control valve means comprises a valve chest having a pressure fluid inlet, a pair of main ports communicating respectively with opposite ends of the cylinder of the said double-acting fluid pressure operable piston and cylinder means for operating the said reciprocatable driving arm of the table-advancing means, and a pair of exhaust ports; a double ended control valve reciprocable in the said valve chest and adapted, when in either of its end positions in the said chest, to place one of the said main ports in communication with the said pressure fluid inlet and to isolate such inlet port from said exhaust ports of the chest whilst simultaneously cutting the other of said main ports off from the said fluid pressure supply and opening such main port to one of the said exhaust ports; means for reciprocating said valve whereby the opposite ends of said cylinder are alternately placed in communication with the pressure fluid inlet of the said valve chest whereby the said piston is alternately moved in opposite directions, first in one direction to effect the rotation of the said table by the said one-way-acting driving arm and then in the opposite direction to effect the release of the table from said driving arm and the return of the latter to its original position.

10. A machine according to claim 9, wherein the said fluid pressure operable piston and cylinder means for actuating the said table locking means comprise a cylinder and a double-acting piston therein, and the opposite ends of the said cylinder are respectively in communication one with each of the said main ports of the said valve chest whereby the said table locking means are alternately operated to lock the table and to release it.

11. A machine according to claim 10, wherein the said table-locking means comprises a bolt adapted to engage in any one of a series of peripherally spaced holes in the said table, such bolt being actuatable by the double-acting piston of the said fluid pressure operable piston and cylinder means for actuating the table locking means.

12. A machine according to claim 11, including a stop catch arranged adjacent to the said rotary table; peripherally spaced stops on said table for co-operation with the said stop catch; spring means for operating said stop catch for arresting the rotation of the said rotary table prior to the table being locked by the said locking bolt and means for operating the said stop catch from the piston of the said table driving arm-reciprocating piston and cylinder means for subsequently disengaging such stop catch from said spaced stops to free the rotary table for further rotational movement when released by the said locking bolt.

13. A machine according to claim 12, including a trip lever for temporarily retaining the said stop catch in an in-operative position, such trip lever being adapted for operation, to release the said stop catch, by one of the said stops on the table as the latter rotates.

14. A machine according to claim 13, including pressure fluid operated reversing means for automatically reversing the movement of the said double-ended valve in the valve chest of the said control valve means.

15. A machine according to claim 14, including at least one processing station arranged adjacent the periphery of the said rotary table and angularly spaced from the said loading position, said processing station including a processing element adapted to act upon an article of footwear on a last on the said table and registered with the said element when the table is stationary, fluid operated means for moving said processing element into and out of engagement with the said article of footwear, and valve means, controlled from the said locking bolt operating piston, for regulating the flow of pressure fluid for operating the said fluid operated processing element-moving means.

16. A machine according to claim 15, wherein the said processing element-moving means comprises a cylinder; a double-acting piston slidable in said cylinder; means for supplying pressure fluid alternately to opposite sides of said piston; and an inflatable pad carried by said piston and constituting the said processing element; and wherein are also provided means for supplying pressure fluid to the said inflatable pad, and valve means, controlled by said last-named piston, for regulating the supply of pressure fluid to said pad and the exhausting of the latter in proper sequence with the operation of the said table and processing element-moving means.

17. A machine according to claim 8 including at least one processing station arranged adjacent the periphery of the said rotary table and angularly spaced from the said loading position, said processing station including a processing element adapted to act upon an article of footwear on a last on the said table and registered with the said element when the table is stationary, fluid operated means for moving said processing element into and out of engagement with the said article of footwear, and valve means, controlled by the said fluid pressure operable piston and cylinder means for actuating said table-locking means, for regulating the flow of pressure fluid for operating the said fluid operated processing element-moving means.

JACK WEBER.
THOMAS PARKINSON CHARNLEY.

REFERENCES CITED

The following references are of record in the file of this patent:

UNITED STATES PATENTS

| Number | Name | Date |
|---|---|---|
| 1,280,615 | Hurlbut | Oct. 1, 1918 |
| 1,352,145 | Quinby | Sept. 7, 1920 |
| 1,578,232 | Ferris | Mar. 23, 1926 |
| 1,748,671 | Demnitz | Feb. 25, 1930 |
| 1,899,001 | Krive | Feb. 28, 1933 |
| 1,920,157 | Walther | July 25, 1933 |
| 2,068,084 | Stahlhammer | Jan. 19, 1937 |